US006275245B1

(12) United States Patent
Wen et al.

(10) Patent No.: US 6,275,245 B1
(45) **Date of Patent: *Aug. 14, 2001**

(54) CONTROLLING AMOUNT OF INK PIXELS PRODUCED BY MICROFLUIDIC PRINTING

(75) Inventors: Xin Wen; Werner Fassler, both of Rochester; Charles D. Deboer, Palmyra, all of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/943,921

(22) Filed: Oct. 3, 1997

(51) Int. Cl.[7] .................... G01D 15/16

(52) U.S. Cl. .................... 346/140.1; 347/7

(58) Field of Search .................... 346/140.1; 347/6, 347/7, 14, 84, 85; 422/100; 435/6; 137/597; 106/31.43

(56) References Cited

U.S. PATENT DOCUMENTS

| | | | | |
|---|---|---|---|---|
| 5,473,350 | * | 12/1995 | Mader et al. | 347/7 |
| 5,585,069 | | 12/1996 | Zanzucchi et al. . | |
| 5,593,838 | | 1/1997 | Zanzucchi et al. | 435/6 |
| 5,603,351 | | 2/1997 | Cherukuri et al. | 137/597 |
| 5,611,847 | | 3/1997 | Guistina et al. | 106/31.43 |
| 5,682,183 | * | 10/1997 | Wade et al. | 347/7 |
| 5,745,128 | * | 4/1998 | Lam et al. | 346/140.1 |
| 5,771,810 | * | 6/1998 | Wolcott | 347/43 |
| 5,774,136 | * | 6/1998 | Barbehenn et al. | 347/7 |
| 5,788,388 | * | 8/1998 | Cowger et al. | 347/7 |

OTHER PUBLICATIONS

"Electroosmosis: A Reliable Fluid Propulsion System for Flow Injection Analysis", by P. Dasgupta, et al., Analytical Chemistry, vol. 66, No. 11, Jun. 1, 1994, pp. 1792–1798.

* cited by examiner

*Primary Examiner*—N. Le
*Assistant Examiner*—Lamson D. Nguyen
(74) *Attorney, Agent, or Firm*—Raymond L. Owens

(57) ABSTRACT

A microfluidic printing apparatus includes at least one ink reservoir; a structure defining a plurality of chambers arranged so that the chambers form an array with each chamber being arranged to form an ink pixel; a plurality of microchannels connecting the reservoir to a chamber and a plurality of microfluidic pumps each being associated with a single microchannel for supplying ink from an ink reservoir through a microchannel for delivery to a particular chamber. The apparatus detects the ink fluid level in the chambers and for producing a signal, and controls the microfluidic pumps for delivering the correct amount of ink delivered into each chamber and responsive to the ink level signal for causing the pumps to terminate the delivery of ink.

4 Claims, 5 Drawing Sheets

CONTROLLING AMOUNT OF INK PIXELS PRODUCED BY MICROFLUIDIC PRINTING

CROSS REFERENCE TO RELATED APPLICATIONS

The present invention is related to U.S. patent application Ser. No. 08/868,426 filed Jun. 3, 1997, entitled "Continuous Tone Microfluidic Printing" to DeBoer, Fassler and Wen; U.S. patent application Ser. No. 08/868,416 filed Jun. 3, 1997 entitled "Microfluidic Printing on Receiver", to DeBoer, Fassler and Wen; U.S. patent application Ser. No. 08/868/102 filed Jun. 3, 1997 entitled "Microfluidic Printing with Ink Volume Control" to Wen, DeBoer and Fassler; U.S. patent application Ser. No., 08/868,102 filed Jun. 3, 1997 entitled "Microfluidic Printing with Ink Flow Regulation" to Wen, Fassler and DeBoer; and U.S. patent application Ser. No. 08/868,104, filed Jun. 3, 1997 entitled "Image Producing Apparatus for Microfluidic Printing"; all assigned to the assignee of the present invention. The disclosure of these related applications is incorporated herein by reference.

FIELD OF THE INVENTION

The present invention relates to printing high quality ink images having the correct amount of ink in each pixel by microfluidic pumping of colored inks onto a receiver.

BACKGROUND OF THE INVENTION

Microfluidic pumping and dispensing of liquid chemical reagents is the subject of three U.S. Pat. Nos. 5,585,069, 5,593,838, and 5,603,351, all assigned to the David Sarnoff Research Center, Inc. The system uses an array of micron sized reservoirs, with connecting microchannels and reaction cells etched into a substrate. Electrokinetic pumps comprising electrically activated electrodes within the capillary microchannels provide the propulsive forces to move the liquid reagents within the system. The electrokinetic pump, which is also known as an electroosmotic pump, has been disclosed by Dasgupta et al., see "Electroosmosis: A Reliable Fluid Propulsion System for Flow Injection Analyses", Anal. Chem. 66, pp 1792–1798 (1994). The chemical reagent solutions are pumped from a reservoir, mixed in controlled amounts, and them pumped into a bottom array of reaction cells. The array may be decoupled from the assembly and removed for incubation or analysis. When used as a printing device, the chemical reagent solutions are replaced by dispersions of cyan, magenta, and yellow pigment, and the array of reaction cells may be considered a viewable display of picture elements, or pixels, comprising mixtures of pigments having the hue of the pixel in the original scene. When contacted with paper, the capillary force of the paper fibers pulls the dye from the cells and holds it in the paper, thus producing a paper print of the original scene. One problem with this kind of printer is the control of the volume of the liquid inks. An oversupply of ink in one cell can spill over to its neighboring cells, producing undesired ink contamination that leads to image defects on the receiver. If not enough of liquid inks are supplied in a cell, the color densities produced by the cell on a receiver will be lower than the intended color densities, which also degrades image quality on the final print.

SUMMARY OF THE INVENTION

It is an object of the present invention to ensure that the correct amount of ink is delivered to the receiver by a microfluidic printer thereby provide high quality images by microfluidic printing.

It is another object of the present invention to provide a microfluidic printing apparatus that is robust and reliable.

These objects are achieved by a microfluidic printing apparatus comprising:

a) at least one ink reservoir;

b) a structure defining a plurality of chambers arranged so that the chambers form an array with each chamber being arranged to form an ink pixel;

c) a plurality of microchannels connecting the reservoir to a chamber;

d) a plurality of microfluidic pumps each being associated with single microchannel for supplying ink from an ink reservoir through a microchannel for delivery to a particular chamber;

e) means for detecting the ink fluid level in the chambers and producing a signal; and f) control means for controlling the microfluidic pumps for delivering the correct amount of ink delivered into each chamber and responsive to the fluid level signal for causing the pumps to terminate the delivery of ink.

ADVANTAGES

An advantage of the present invention is the provision of ink volume detection to ensure that the correct amount of ink is delivered to a receiver thereby reducing image defects.

DETAILED DESCRIPTION OF THE INVENTION

The present invention is described in relation to a microfluidic printing apparatus which can print computer generated images, graphic images, line art, text images and the like, as well as continuous tone images.

Figure 1:
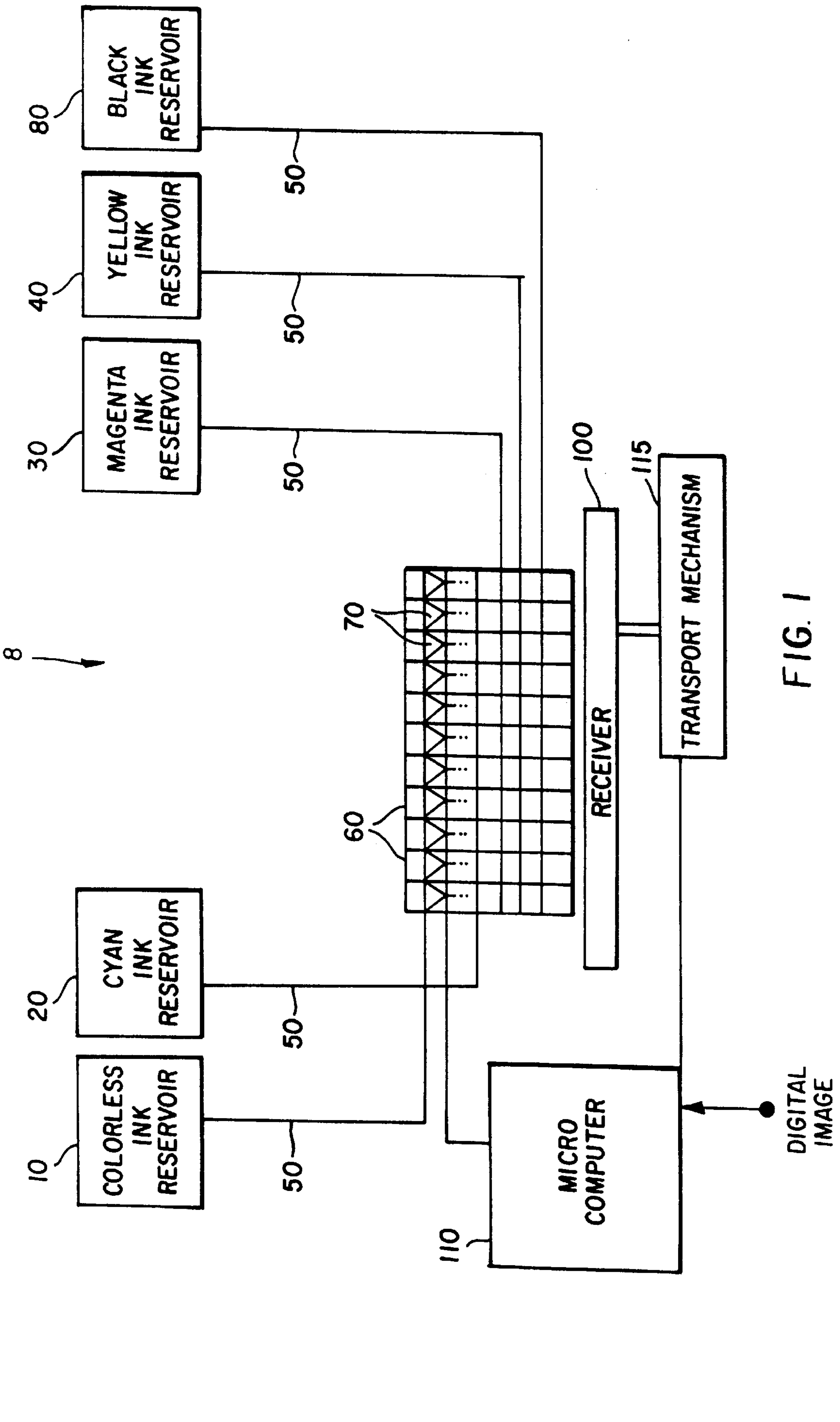
FIG. 1 is a partial schematic view showing an apparatus for pumping, mixing and printing pixels of ink onto a reflective receiver.

Referring to FIG. 1, a schematic diagram is shown of a printing apparatus 8 in accordance with the present invention. Reservoirs 10, 20, 30, and 40 are respectively provided for holding colorless ink, cyan ink, magenta ink, and yellow ink. An optional reservoir 80 is shown for black ink. Microchannel capillaries 50 respectively connected to each of the reservoirs conduct ink from the corresponding reservoir to an array of ink mixing chambers 60. In the present invention, the ink mixing chambers 60 deliver the inks directly to a receiver; however, other types of ink delivery arrangements can be used such as microfluidic channels, and so when the word chamber is used, it will be understood to include those arrangements. The colored inks are delivered to ink mixing chambers 60 by electrokinetic pumps 70. The amount of each color ink is controlled by computer 110 according to the input digital image. For clarity of illustration, only one set of electrokinetic pumps is shown for the colorless ink channel. Similar pumps are used for the other color channels, but these are omitted from the FIG. for clarity. Finally, a reflective receiver 100 is transported by a transport mechanism 115 to come in contact with the microfluidic printing apparatus. The receiver 100 receives the ink and thereby produces the print. Receivers may include common bond paper, made from wood fibers, as well as synthetic papers made from polymeric fibers. In addition receiver can be of non-fibrous construction, provided they absorb and hold the ink used in the printer.

Figure 2:
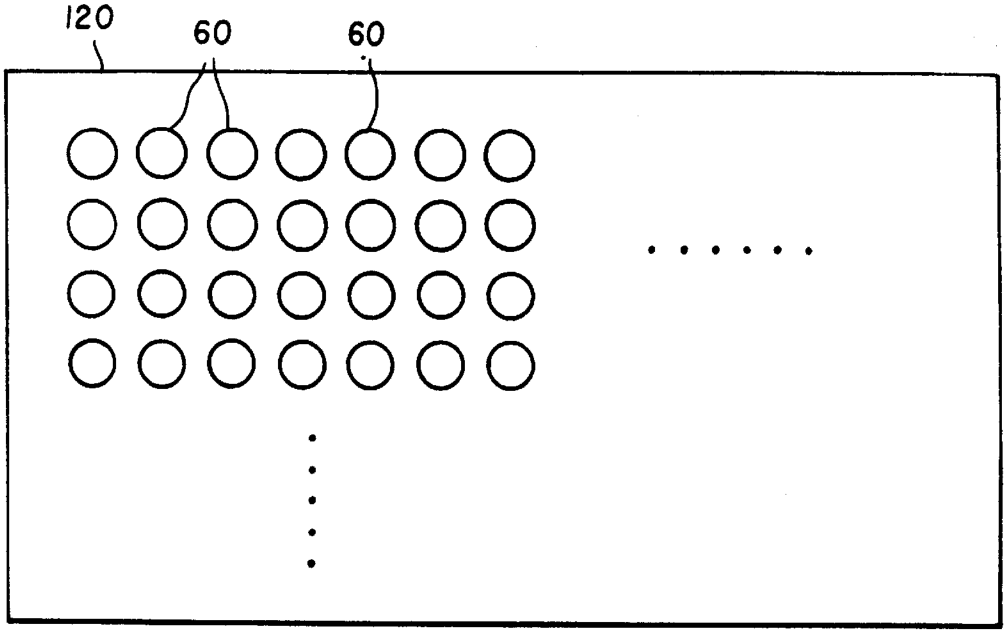
FIG. 2 is a top view of the pattern of the color pixels described in the present invention.

FIG. 2 depicts a top view of an arrangement of mixing chambers 60 shown in FIG. 1. Each ink mixing chamber 60 is capable of producing a mixed ink having any color saturation, hue and lightness within the color gamut provided by the set of cyan, magenta, yellow, and colorless inks used in the apparatus.

The inks used in this invention are dispersions of colorants in common solvents. Examples of such inks may be found is U.S. Pat. No. 5,611,847 by Gustina, Santilli and Bugner. Inks may also be found in the following commonly assigned U.S. patent application Ser. Nos. 08/699,955, 08/699,962 and 08/699,963 by McInerney, Oldfield, Bugner, Bermel and Santilli, and in U.S. patent application Ser. No. 08/790,131 by Bishop, Simons and Brick, and in U.S. patent application Ser. No. 08/764,379 by Martin. In a preferred embodiment of the invention the solvent is water. Colorants such as the Ciba Geigy Unisperse Rubine 4BA-PA, Unisperse Yellow RT-PA, and Unisperse Blue GT-PA are also preferred embodiments of the invention. The colorless ink of this invention is the solvent for the colored inks in the most preferred embodiment of the invention.

The microchannel capillaries, ink pixel mixing chambers and microfluidic pumps are more fully described in the references listed above.

Figure 3:
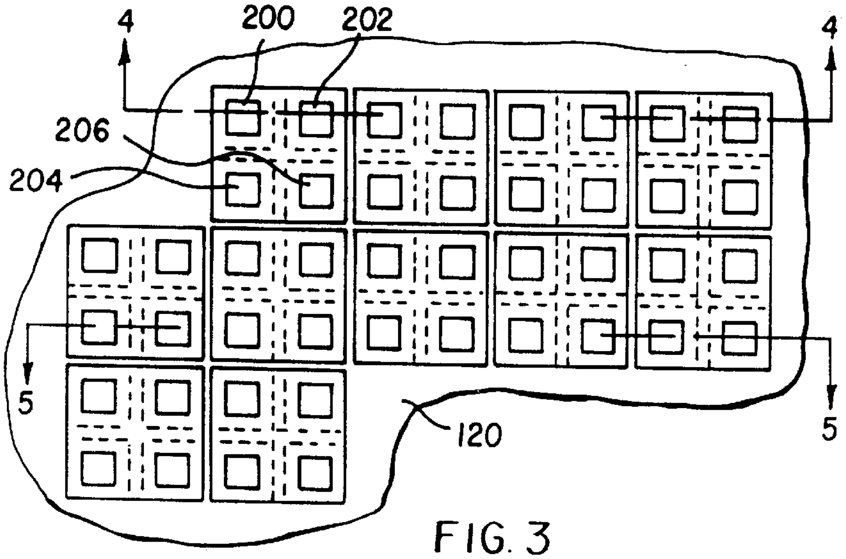
FIG. 3 is a top view of a second pattern of the color pixels described in the present invention.

FIG. 3 illustrates the arrangement of a second pattern of color pixels in the present invention. The ink mixing chambers 60 are divided into four groups cyan ink orifice 200; magenta ink orifice 202; yellow ink orifice 204; and black ink orifice 206. Each chamber is connected only to the respective colored ink reservoir and to the colorless ink reservoir 10. For example, the cyan ink orifice 200 is connected to the cyan ink reservoir and the colorless ink reservoir so that cyan inks can be mixed to any desired lightness. When the inks are transferred to the reflective receiver 100 some of the inks can mix and blend on the receiver. Inasmuch as the inks are in distinct areas on the receiver, the size of the printed pixels should be selected to be small enough so that the human eye will integrate the color and the appearance of the image will be that of a continuous tone photographic quality image.

Figure 4:
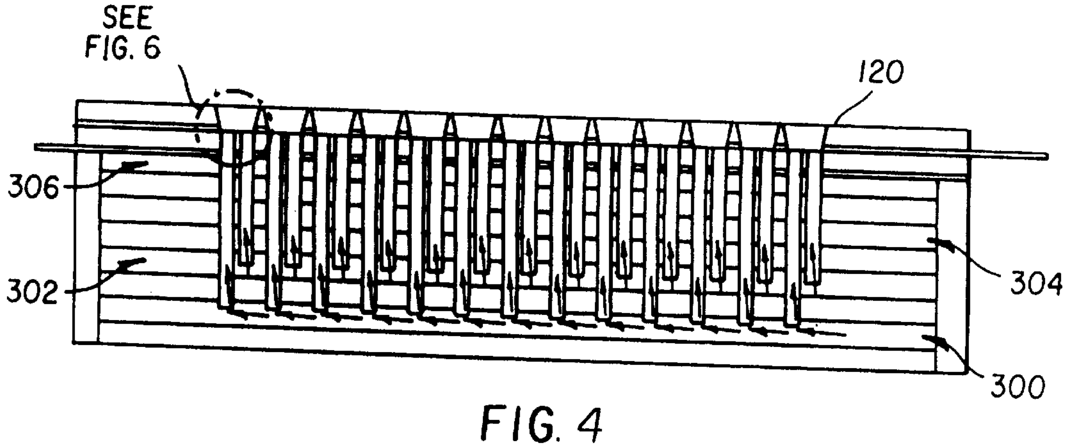
FIG. 4 is cross-sectional view taken along the lines 4—4 of the microfluidic printing apparatus in FIG. 3.
Figure 5:
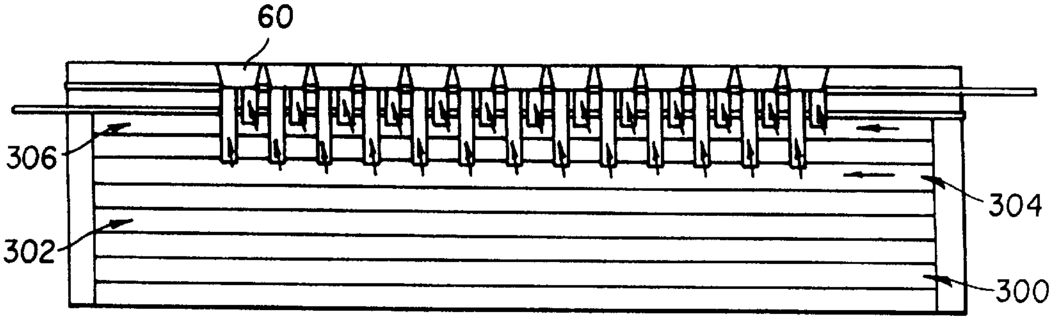
FIG. 5 is another cross-sectional view taken along the lines 5—5 of the microfluidic printing apparatus in FIG. 3.

Cross-sections of the color pixel arrangement shown in FIG. 3 are illustrated in FIG. 4 and FIG. 5. The colored ink supplies 300, 302, 304, and 306 are fabricated in channels parallel to the printer front plate 120. The cyan, magenta, yellow and black inks are respectively delivered by colored ink supplies 300, 302, 304, and 306 into each of the colored ink mixing chambers.

Figure 6:
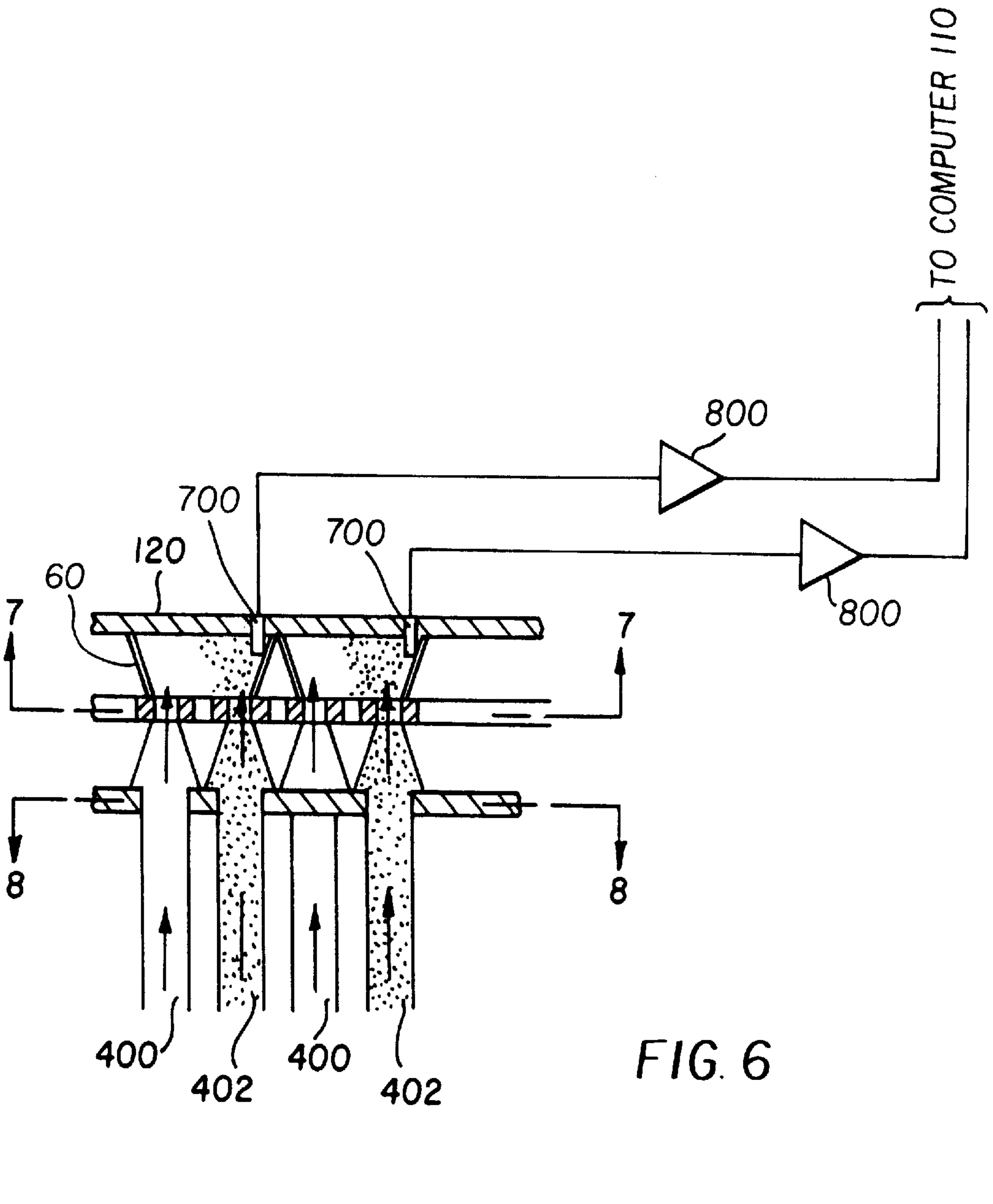
FIG. 6 is an enlarged view of the circled portion of FIG. 4, showing the sensor for ink level in the ink mixing chamber.
Figure 8:
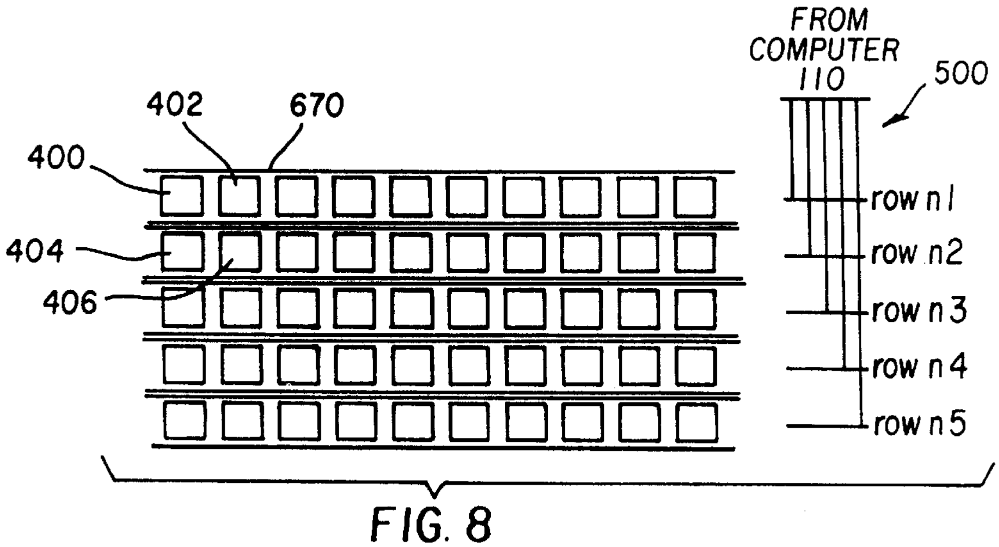
FIG. 8 is a top view of the microchannel and showing conducting circuit connections in FIG. 6.

A detailed view of the cross-section in FIG. 4 is illustrated in FIG. 6. The colored inks are delivered to the ink mixing chambers respectively by cyan, magenta, yellow, and black ink microchannels 400, 402, 404, and 406. (404 and 406 are not shown in FIG. 6, but are illustrated in FIG. 8.) The colored ink microchannels 400, 402, 404, and 406 are respectively connected to the colored ink supplies 300, 302, 304, and 306 (FIGS. 4 and 5). The colorless ink is supplied to the ink mixing chamber, but is not shown in FIG. 6 for clarity of illustration. A ink sensor 700 is shown to be provided near the top edge of each ink mixing chamber 60. The sensor 700 is corrosion resistant so that it is durable and is applicable to different types of inks as disclosed above. The sensor can made of stainless steel or conducting polymeric material. The sensor is also desirably fabricated in a pointed shape for increased sensitivity. The sensors 700 are connected to conducting circuit 750. In one method of ink detection, the electric resistance across the column electrodes 650 and the sensors 700 is measured. When the ink level in the ink mixing chambers 60 is below the location of the sensor 700, there is essentially zero electric current in the above circuit and the resistance is essentially infinity. Once the ink comes to be in contact with the sensors 700, an electric current is formed by the ion motion in the ink fluid. The electric currents are amplified by amplifiers 800. It will be understood that the amplifiers 800 can also include an A/D converter for digitizing the fluid level signal. When a voltage is produced indicating that a finite electric resistance is detected, the computer 110 includes a program for determing that the ink fluid level has reached the level of the sensors 700. In another method of ink detection, an AC voltage is applied across the column electrodes 650 and the sensors 700, the impedance (or capacitance) across the ink mixing chamber is measured. The difference in the dielectric constants between the air and the ink fluid generates a large impedance change when the ink fluid level is raised to be in contact with the sensor 700.

In an alternative embodiment of the present invention, a multiple of sensors 700 are provided in each ink mixing chamber 60. Each of the multiple of sensors 700 is located at different height positions in the ink mixing chamber. These sensors can detect a plurality of ink levels so that ink delivery can be monitored through the delivering process. Furthermore, the multiple of sensors permit different total ink volumes in the ink mixing chambers which is useful for different applications. For example, different receivers have different fluid absorbing power, that is, saturation ink laydown. The total ink volume delivered to a receiver by an ink mixing chamber can thus be tailored according to the receiver types in this embodiment of the present invention. A user enters into the computer 110 information relating to the amount of ink that should be in each pixel formed on the receiver. The computer 110 selects the appropriate one of the sensors 700 and uses its signal for controlling the amount of ink to be delivered to the receiver. This process can be automated and different colors can have different amounts of ink depending upon the desired aesthetics for a given print application.

Figure 7:
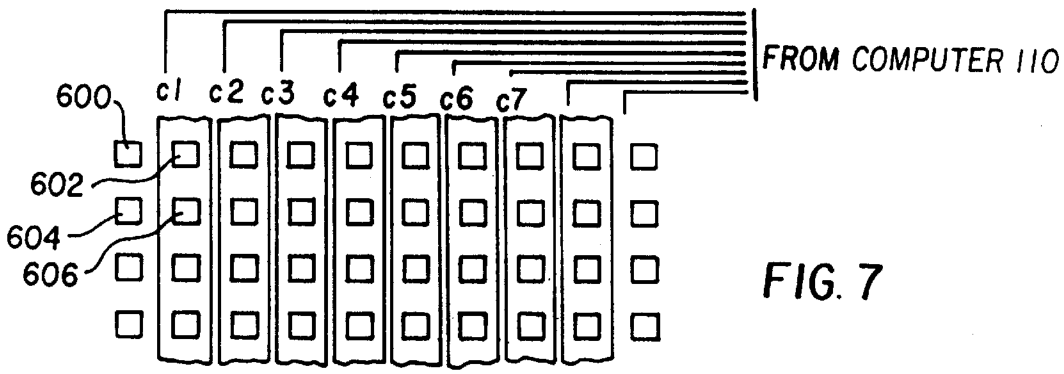
FIG. 7 is a top view of the micronozzles shown in FIG. 6.

A cross-section view of the plane containing the micronozzles in FIG. 6 is shown in FIG. 7. The cyan, magenta, yellow, and black ink micronozzles 600, 602, 604, and 606 are distributed in the same arrangement as the colored ink micro channels 300–304 and the colored ink mixing chambers 200–206. The column electrodes 650 are shown connected to the conducting circuit 550, which is further connected to computer 110.

A cross-section view of the plane containing the microchannels in FIG. 6 is shown in FIG. 8. The color ink channels 400–406 are laid out in the spatial arrangement that corresponds to those in FIGS. 3 and 7. The lower electrodes in the electrokinetic pumps for delivering the colored inks are not shown for clarity of illustration. The row electrodes 670 are connected to lower electrodes of the electrokinetic pumps. The row electrodes 670 are shown connected to the conducting circuit 500, which is further connected to computer 110.

The operation of a microfluidic printer comprises the steps of activating the electrokinetic pumps to pump each color ink to the mixing chamber at the correct ink ratios to provide a pixel of the correct hue and intensity corresponding to the pixel of the scene being printed. When the ink fluid level reaches the sensors 700, the electrokinetic pumping is stopped by the computer. Although variabilities in the pumping rates may exist between different ink mixing chambers, the detection of the ink level assures equal total ink volume in all ink mixing chambers. The duration of the electrokinetic pumping may therefore be slightly different for different ink mixing chambers. The receiver is then contacted to the mixing chambers and capillary or absorption forces draw the ink from the mixing chambers to the receiver. The receiver is then removed from contact with the mixing chambers and allowed to dry.

The microfluidic printing apparatus in the present invention is also compatible with ink flow regulation devices such as microvalves as disclosed in the above referenced and commonly assigned patent applications. The ink flow regulation devices can be used to stop the ink flow and disconnect the ink fluid in the ink mixing chambers from the ink microchannels after the correct ink level is reached as detected by sensor 700. Furthermore, the pump rates and pumping times for each desired color density output can also be pre-calibrated, which is disclosed in the above referenced and commonly assigned U.S. patent application Ser. No. 08/868,426, filed Jun. 3, 1997 entitled "Image Producing Apparatus for Microfluidic Printing". The combination of ink level detection by sensor 700 and the pre-calibration of the pump rates and times assures the accurate total ink volume as well as the ratios of color inks delivered to each ink mixing chamber.

The invention has been described in detail with particular reference to certain preferred embodiments thereof, but it will be understood that variations and modifications can be effected within the spirit and scope of the invention.

Parts List

8 microfluidic printing system
10 colorless ink reservoir
20 cyan ink reservoir
30 magenta ink reservoir
40 yellow ink reservoir
50 microchannel capillaries
60 ink mixing chambers, or printing nozzles
70 electrokinetic pumps
80 black ink reservoir
100 receiver
110 computer
115 transport mechanism
120 printer front plate
200 cyan ink orifice
202 magenta ink orifice
204 yellow ink orifice
206 black ink orifice
300 cyan ink supply
302 magenta ink supply
304 yellow ink supply
306 black ink supply
400 cyan ink microchannel
402 magenta ink microchannel
404 yellow ink microchannel
406 black ink microchannel
500 conducting circuit
550 conducting circuit
600 cyan ink micro-orifice
602 magenta ink micro-orifice
604 yellow ink micro-orifice
606 black ink micro-orifice
650 column electrodes
670 row electrodes
700 sensor
750 conducting circuit
800 amplifier

What is claimed is:

1. A microfluidic printing apparatus comprising:

a) at least one ink reservoir;

b) a structure defining a plurality of chambers arranged so that the chambers form an array with each chamber being arranged to form an ink pixel;

c) a plurality of microchannels each connecting the reservoir to each chamber;

d) a plurality of microfluidic pumps each being associated with a single microchannel for supplying ink from the ink reservoir through each microchannel for delivery to a particular chamber;

e) means for detecting an ink fluid level in each of the chambers and for producing a signal for each chamber representative of the fluid level in such chamber; and f) control means for controlling the microfluidic pumps for delivering a correct amount of ink delivered into each chamber and responsive to the fluid level signal for respectively causing each of the pumps to terminate the delivery of ink when the correct amount of ink is in each of the chambers.

2. The printing apparatus of claim 1 wherein the detection means includes a detector for detecting an electric resistance in the ink for producing a signal for each chamber representative of the ink level in such chamber.

3. The printing apparatus of claim 1 wherein the detection means includes a detector for detecting an electric capacitance in the ink for producing a signal for each chamber representative of the ink level in such chamber.

4. The printing apparatus of claim 1 wherein the detection means comprise a plurality of sensors for detecting different levels of ink and further including means for selecting one of the plurality of sensors corresponding to a desired ink level.

* * * * *